United States Patent
Kung et al.

(10) Patent No.: US 8,625,409 B2
(45) Date of Patent: Jan. 7, 2014

(54) METHOD AND APPARATUS FOR CORRELATING AND SUPPRESSING PERFORMANCE ALERTS IN INTERNET PROTOCOL NETWORKS

(75) Inventors: Yu-Lein Kung, Holmdel, NJ (US); Jeffrey Stein, Cliffwood, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 513 days.

(21) Appl. No.: 12/850,325

(22) Filed: Aug. 4, 2010

(65) Prior Publication Data
US 2012/0033544 A1 Feb. 9, 2012

(51) Int. Cl.
*G01R 31/08* (2006.01)
*H04L 1/00* (2006.01)

(52) U.S. Cl.
USPC .......................................... 370/221; 370/217

(58) Field of Classification Search
USPC .................. 370/216–228, 241–253
See application file for complete search history.

(56) References Cited

U.S. PATENT DOCUMENTS

| | | | | |
|---|---|---|---|---|
| 7,505,567 | B1* | 3/2009 | Eslambolchi et al. | 379/14.01 |
| 8,223,630 | B2* | 7/2012 | Yasrebi et al. | 370/221 |
| 2004/0008717 | A1* | 1/2004 | Verma et al. | 370/432 |
| 2007/0140133 | A1* | 6/2007 | Gudipalley et al. | 370/242 |
| 2008/0267075 | A1* | 10/2008 | Yasrebi et al. | 370/242 |
| 2010/0034085 | A1* | 2/2010 | Qiu et al. | 370/232 |
| 2010/0128860 | A1* | 5/2010 | Kung et al. | 379/112.01 |
| 2010/0218104 | A1* | 8/2010 | Lewis | 715/736 |
| 2011/0055138 | A1* | 3/2011 | Khanduja et al. | 706/47 |
| 2011/0080828 | A1* | 4/2011 | North et al. | 370/235 |
| 2011/0122773 | A1* | 5/2011 | Kung et al. | 370/241 |
| 2011/0196964 | A1* | 8/2011 | Natarajan et al. | 709/224 |
| 2011/0252126 | A1* | 10/2011 | Van Horne et al. | 709/224 |

\* cited by examiner

*Primary Examiner* — Warner Wong (57) ABSTRACT

A method and apparatus for correlating and suppressing performance alerts in a packet network are disclosed. In one embodiment, a method for handling alerts in a packet network includes receiving a plurality of alerts relating to one or more faults in the packet network, wherein the plurality of alerts is generated from information contained in a plurality of call detail records, correlating the plurality of alerts into one or more sets of performance alerts, each of the one or more sets of performance alerts being associated with a common one of the one or more faults, and suppressing at least one further alert relating to at least one of the one or more sets.

15 Claims, 5 Drawing Sheets

METHOD AND APPARATUS FOR CORRELATING AND SUPPRESSING PERFORMANCE ALERTS IN INTERNET PROTOCOL NETWORKS

The present disclosure relates generally to network communications and relates more particularly to the handling of performance alerts in a packet network, e.g., an Internet Protocol (IP) networks.

BACKGROUND

A Voice over Internet Protocol (VoIP) network is a type of IP network that delivers voice communications. These communications produce call detail records (CDRs), which are computer records containing the details of the calls that are handled by the VoIP network. Although traditionally used for billing purposes, CDRs may also be used to monitor the performance of the VoIP network. In particular, if a network element performance management system detects a call failure in a CDR (such as a dropped call), the network element performance management system generates an alert that may be forwarded, for example, to a network administrator or a security system.

Any given call failure will typically result in a plurality of such alerts. For instance, multiple network elements involved in a failed call may each produce CDRs that generate an alert for the same failed call, or a single network element may produce multiple CDRs that generate multiple types of alerts for the same failed call. Such a volume of redundant alerts wastes the resources of administrators and also increases the likelihood of inaccurate network performance results being generated. Moreover, the volume of redundant alerts often makes it difficult for administrators to isolate faults and detect delays in the VoIP network.

SUMMARY

In one embodiment, the present disclosure is a method and apparatus for correlating and suppressing performance alerts in a packet network. In one embodiment, a method for handling alerts in a packet network includes receiving a plurality of alerts relating to one or more faults in the packet network, wherein the plurality of alerts is generated from information contained in a plurality of call detail records, correlating the plurality of alerts into one or more sets of performance alerts, each of the one or more sets of performance alerts being associated with a common one of the one or more faults, and suppressing at least one further alert relating to at least one of the one or more sets.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for correlating and suppressing performance alerts in a packet network, e.g., an Internet Protocol (IP) network. Embodiments of the disclosure may be implemented, for example, to correlate performance alerts generated by network element performance management systems in a Voice over IP (VoIP) network. In particular, the disclosure correlates performance alerts for calls and/or network elements that indicate the same type of call failure, and then takes steps to suppress further alerts for the same type of call failure from these calls and/or network elements. As a result, redundant alerts are significantly reduced. This not only improves the accuracy of the performance alerts, but also reduces the amount of time required to analyze and respond to performance alerts. Although the present disclosure is described below within the exemplary context of a VoIP network, those skilled in the art will appreciate that the techniques disclosed herein may be extended to IP networks and packet networks in general.

Figure 1:
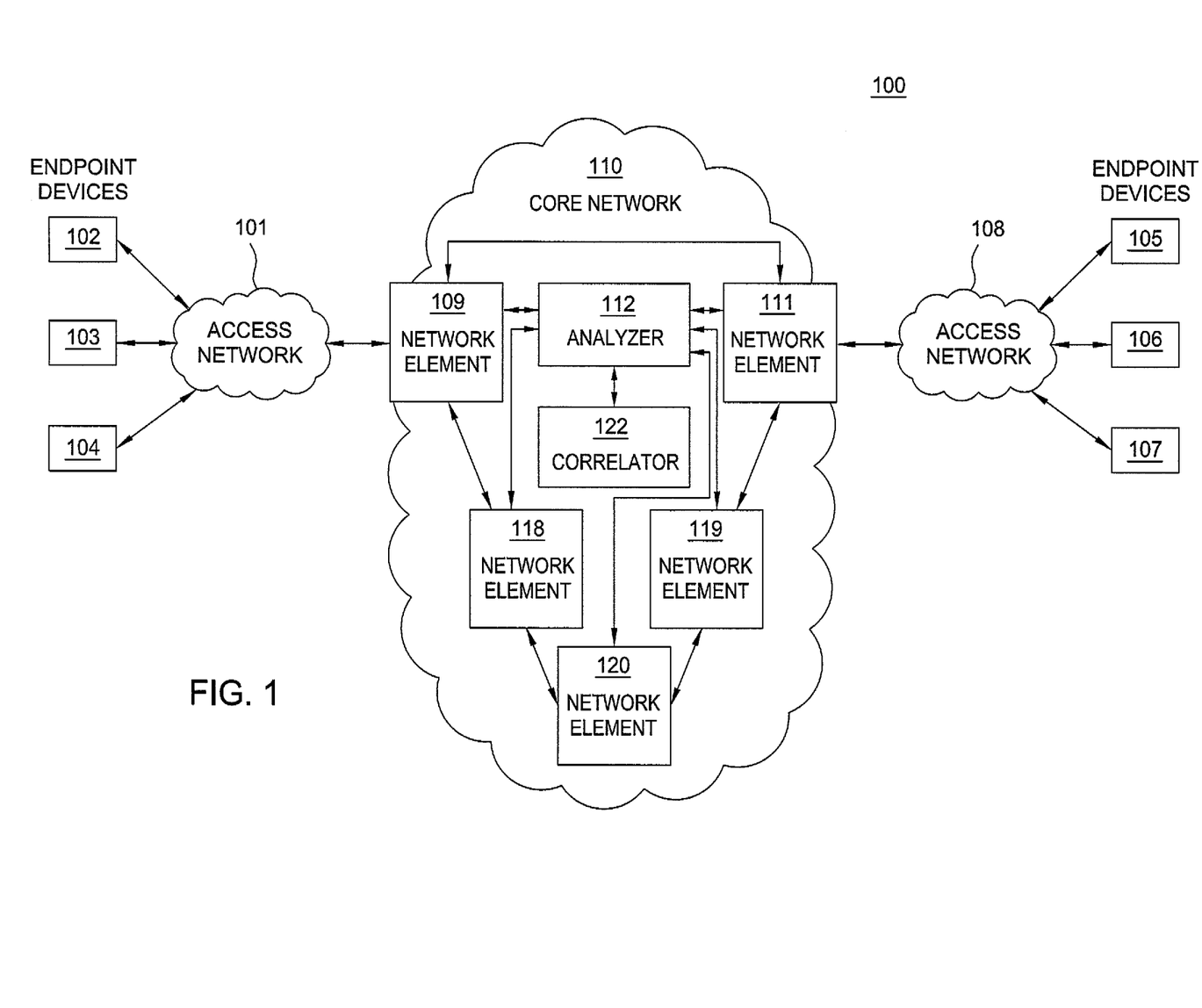
FIG. 1 is a block diagram illustrating an exemplary packet network, configured according to embodiments of the current disclosure.

FIG. 1 is a block diagram illustrating an exemplary packet network 100, configured according to embodiments of the current disclosure. Exemplary packet networks include IP networks, Ethernet networks, and the like. An IP network is broadly defined as a network that uses Internet Protocol such as IPv4 or IPv6, and the like to exchange data packets. In one embodiment, the packet network 100 is a VoIP network.

In one embodiment, a first plurality of endpoint devices 102-104 reside outside the packet network and are configured for communication with the core packet network 110 (e.g., an IP-based core backbone network) via a first access network 101. Similarly, a second plurality of endpoint devices 105-107 reside outside the packet network and are configured for communication with the core packet network 110 via a second access network 108.

The network elements (NEs) 109, 111, 118, 119, and 120 may serve as gateway servers or edge routers for the core packet network 110. In one embodiment, the first and second pluralities of endpoint devices 102-104 and 105-107 may comprise ISDN private branch exchanges (PBXs), automatic call distributors (ACDs), or ISDN telephones. In one embodiment, the first and second access networks 101 and 108 are time division multiplex (TDM) networks, and the like. In another embodiment, the first and second access networks 101 and 108 are IP-based networks, similar to the core packet network 110.

Furthermore, the endpoint devices 102-107 may comprise customer endpoint devices such as personal computers, laptop computers, Personal Digital Assistants (PDAs), landline telephones, cellular telephones, servers, routers, and the like. In one embodiment, at least some of the endpoint devices 102-107 are ISDN telephones. The first and second access networks 101 and 108 serve as a means to establish a connection between the endpoint devices 102-107 and the NEs 109 and 111 of the core packet network 110. Thus, the endpoint devices 102-107 are outside of the access networks 101 and 108 and the core packet network 110. The first and second access networks 101 and 108 may each comprise a Digital Subscriber Line (DSL) network, a broadband cable access network, a Local Area Network (LAN), a Wireless Access Network (WAN), a third party network, a cellular network and the like. The first and second access networks 101 and 108 may be either directly connected to NEs 109 and 111 of the core packet network 110, or indirectly through another network.

Some NEs (e.g., NEs 109 and 111) reside at the edge of the core packet network 110 and interface with customer endpoint devices 102-107 over various types of access networks (e.g., first and second access networks 101 and 108). An NE that resides at the edge of a core infrastructure is typically implemented as an edge router, a media gateway, a border element, a firewall, a switch, or the like. An NE may also reside within the network (e.g., NEs 118-120) and may be used as a mail server, a router, or a like device.

In one embodiment, the core packet network 110 also comprises an analyzer 112 and a correlator 122. Collectively, the analyzer 112 and correlator 122 form a network element performance management system that classifies call detail records (CDRs), generates alerts from the CDRs, and performs correlation and suppression of the alerts. For example, the analyzer 112 may collect CDRs generally from the NEs 109, 111, and 118-120 and/or CDRs based on the numbering plan areas (NPAs) of the customer endpoint devices 102-107. As discussed above, CDRs are electronic records containing the details of calls placed in the packet network 100. The analyzer 112 parses call statistics from the data fields of the CDRs. These call statistics may include information that indicates call failures (e.g., blocked or cut off calls) or successful calls. It should be noted that there are many faults or call events that can be documented in the CDRs. As such, the illustrative faults discussed in the present disclosures are only illustrative in nature and should not be interpreted as limiting the scope of the present disclosure. When the analyzer 112 detects a call failure in a CDR, the analyzer 112 outputs an alert that may be used to notify an administrator of a problem in the packet network 100. Alternatively, the analyzer 112 may simply output the call statistics that indicate failures (and/or the corresponding CDRs) to a dedicated alert generator (not shown). In this case, the alert generator outputs the actual alerts based on the call statistics received from the analyzer 112.

In one embodiment, the correlator 122 is coupled to the analyzer 112 and receives the alerts that are generated from the CDR data. It should be noted that although the correlator 122 and the analyzer 112 are illustrated as two separate units, in one embodiment, the correlator 122 and the analyzer 112 can be implemented as a single system or module. The correlator 122 attempts to correlate the alerts into groups that indicate a common failure or root cause. For example, a single call failure may result in a plurality of alerts generated from the CDRs of multiple network elements and/or NPAs. Alternatively, the failure of a single network element may result in a plurality of alerts generated from the CDRs for calls that involved the failed network element. The correlator 122 applies one or more algorithms in order to correlate the alerts that are received. In addition, these algorithms may further require the correlator 122 to take measures to suppress further alerts related to certain network elements and/or NPAs, as discussed in further detail below. The correlator 122 outputs correlated alerts to a network administrator or security system.

Those skilled in the art will realize that although only six endpoint devices 102-107, two access networks 101 and 108, and so on are depicted in FIG. 1, the packet network 100 may be expanded by including additional endpoint devices, access networks, border elements, and the like without altering the present disclosure.

Figure 2:
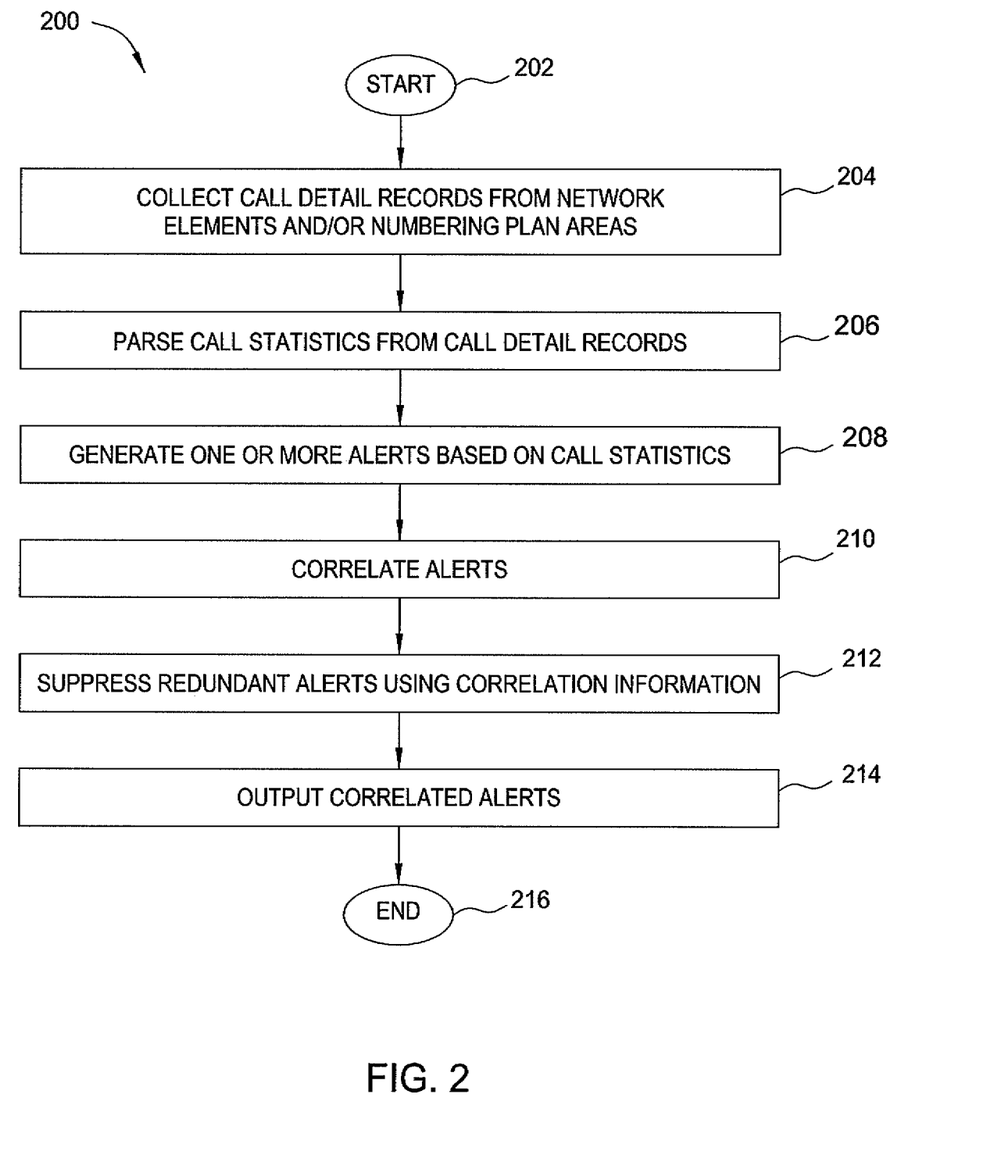
FIG. 2 is a flow diagram illustrating one embodiment of a method for correlating and suppressing performance alerts in an Internet Protocol network.

FIG. 2 is a flow diagram illustrating one embodiment of a method 200 for correlating and suppressing performance alerts in a packet network, e.g., an IP network. The method 200 may be implemented, for example, by the analyzer 112 and correlator 122 illustrated in FIG. 1. As such, reference is made in the discussion of the method 200 to various elements of the packet network 100. It will be appreciated, however, that the method 200 is not limited to deployment in networks configured as illustrated in FIG. 1. The method 200 may, in fact, be deployed in networks that are configured in manners that differ from the configuration of the packet network 100.

The method 200 is initialized in step 202 and proceeds to step 204, where the analyzer 112 collects CDRs from the network elements 109, 111, and 118-120 and/or from the NPAs of the endpoint devices 102-107.

In step 206, the analyzer 112 parses call statistics from the collected CDRs. For example, the analyzer 112 examines the data fields of the CDRs for information that would indicate a call failure or a call success.

In step 208, the analyzer 112 generates one or more alerts, based on the call statistics. These alerts may indicate, for example, a blockage at a network element or in an NPA, a cutoff at a network element or in an NPA, the presence of a busy signal, a packet loss, the presence of a disconnect cause code, the presence of a data not ready signal, or the lack of an answer to a call. Again, this is only an illustrative list of recorded call events and the present disclosure is not limited to this list.

In step 210, the correlator 122 correlates the alerts. In particular, the correlator 122 groups the alerts into sets that indicate a common problem or a root cause. For example, a plurality of alerts generated from CDRs from a plurality of different network elements may indicate the same call failure. Similarly, a plurality of alerts generated from CDRs from a given NPA may indicate the same network element failure in a particular NPA.

In step 212, the correlator 122 suppresses redundant alerts, using information from the correlation step (i.e., step 210). In particular, the correlator 122 suppresses further alerts that relate to one of the common problems or root causes identified in the correlation step. In one embodiment, the suppression of redundant alerts is guided by one or more specific algorithms that determine when and how to suppress alerts. In general, these algorithms suppress NPA-related alerts when the root cause is a network element problem, and suppress network element-based alerts when the root cause is an NPA (i.e., routing-related) problem. In one embodiment, this also includes generating only one network element-based alert and suppressing other network element-based alerts when calls have the same call flow with the same root cause. Some exemplary algorithms that may be used to suppress alerts are discussed in further detail below.

In step 214, the correlator 122 outputs the correlated results, for example to a security system or to a network administrator. The method 200 then terminates in step 216.

Figure 3:
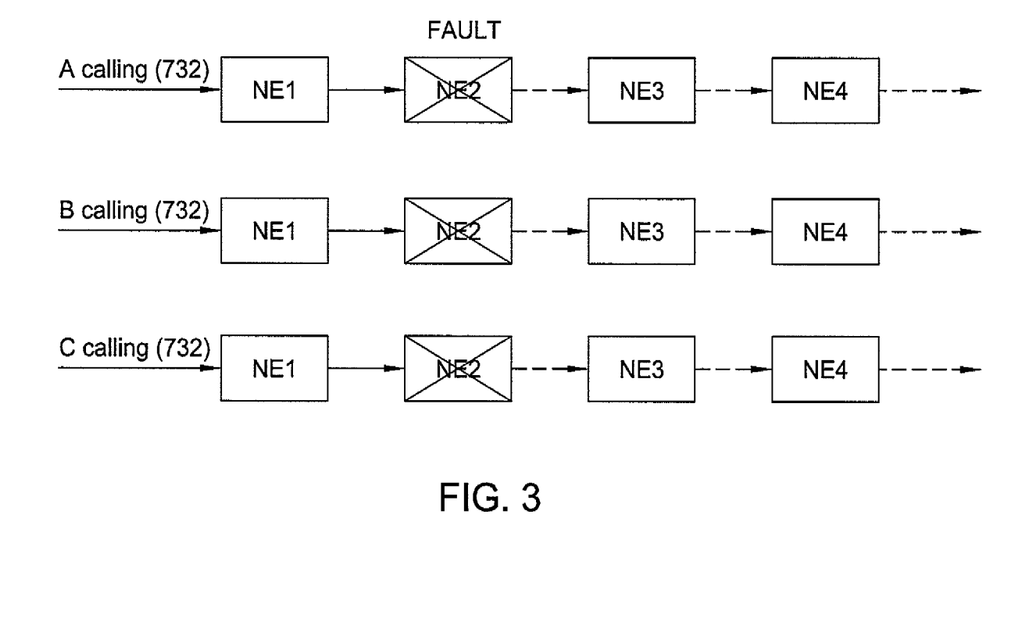
FIG. 3 is a schematic diagram illustrating a first exemplary scenario in which multiple alerts may be generated from CDRs produced by the same network element for multiple calls having the same type of call failure.

FIG. 3 is a schematic diagram illustrating a first exemplary scenario in which multiple alerts may be generated from CDRs produced by the same network element for multiple calls having the same type of call failure. In particular, FIG. 3 illustrates three calls placed to the NPA "732", from callers A, B, and C. All three of these calls fail due to a fault at the network element labeled as NE2.

Without the correlation and suppression technique discussed above, at least two different alerts will be generated for this fault. Assuming that the "blockage node" alert threshold for the network elements is two (i.e., two failed calls), a first alert will be generated. In addition, assuming that the "blockage NPA" alert threshold for the NPA (La, NPA 732) of the network element NE2 is three (i.e., three failed calls), a second alert will also be generated. In one embodiment, counts for the number of failed calls for each NPA and the network elements are maintained, and the alerts are generated by the network element performance management system when these counts meet or exceed their respective thresholds.

In one embodiment, the present disclosure employs a correlation and suppression algorithm that results in only a single alert being generated for the call failure illustrated in FIG. 3. As discussed above, assuming that the threshold is two for the network element NE2, a "blockage node" alert will be generated for the network element NE2 when A's and B's calls to the NPA 732 fail. When this occurs, the correlation and suppression method of the present disclosure will reduce the failed call count for "blockage NPA" alerts for the NPA 732 by two (i.e., the number of failed calls thus far counted for the network element NE2); thus the new failed call count for the NPA 732 is zero. Next, when C calls the NPA 732 and fails, the count for "blockage NPA" alerts will be only one. Thus, no "blockage NPA" alert will be generated by the network element performance management system at this time (again assuming that the threshold for "blockage NPA" alerts is three). Therefore, by suppressing "blockage NPA" alerts for an NPA in which a "blockage node" alert has already been generated, the number of alerts generated for the same type of call failure can be reduced.

Figure 4:
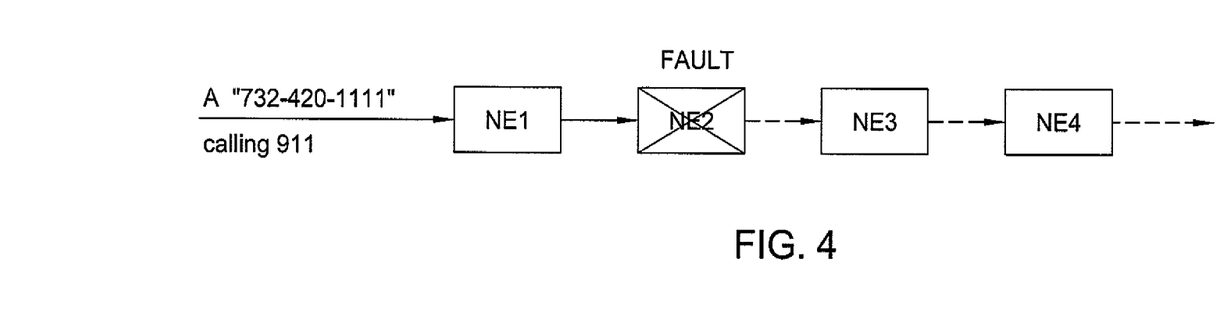
FIG. 4 is a schematic diagram illustrating a second exemplary scenario in which multiple alerts for the same type of call failure may be generated from CDRs produced by a single network element for a single call.

FIG. 4 is a schematic diagram illustrating a second exemplary scenario in which multiple alerts for the same type of call failure may be generated from a single network element for a single call. In particular, FIG. 4 illustrates one call placed to 911 from caller A (whose telephone number is 732-420-1111). This call fails due to a fault at the network element NE2.

Without the correlation and suppression technique discussed above, at least two different alerts will be generated for this fault. Assuming that the "originating caller 911 cutoff" alert threshold for the calling number 732-420-1111 is one (i.e., one failed call), a first alert will be generated. An "originating caller 911 cutoff" is an NPA-related alert. In addition, assuming that the "cutoff 911 node" alert threshold for the network element NE2 is one (i.e., one failed call), a second alert will also be generated. Counts for the number of failed calls for each calling number and the network elements are maintained, and the alerts are generated by the network element performance management system when these counts meet or exceed their respective thresholds.

In one embodiment, the present disclosure employs a correlation and suppression algorithm that results in only a single alert being generated for the call failure illustrated in FIG. 4. As discussed above, assuming that the threshold is one for the calling number 732-420-1111 dialing 911, an "originating caller 911 cutoff" alert will be generated for the calling number 732-420-1111 when A's call to 911 fails. When this happens, the correlation and suppression method of the present disclosure will reduce the failed call count for "cutoff 911 node" alerts for the network element NE2 by one (i.e., the number of failed calls thus far counted for the calling number 732-420-1111); thus the new failed call count for the network element NE2 is zero. As a result, no "cutoff 911 node" alert will be generated by the network element performance management system at this time (again assuming that the threshold for "cutoff 911 node" alerts is one). Therefore, by suppressing "cutoff 911 node" alerts for a network element that serves an NPA in which an "originating caller 911 cutoff" alert has already been generated, the number of alerts generated for the same type of call failure can be reduced.

Figure 5:
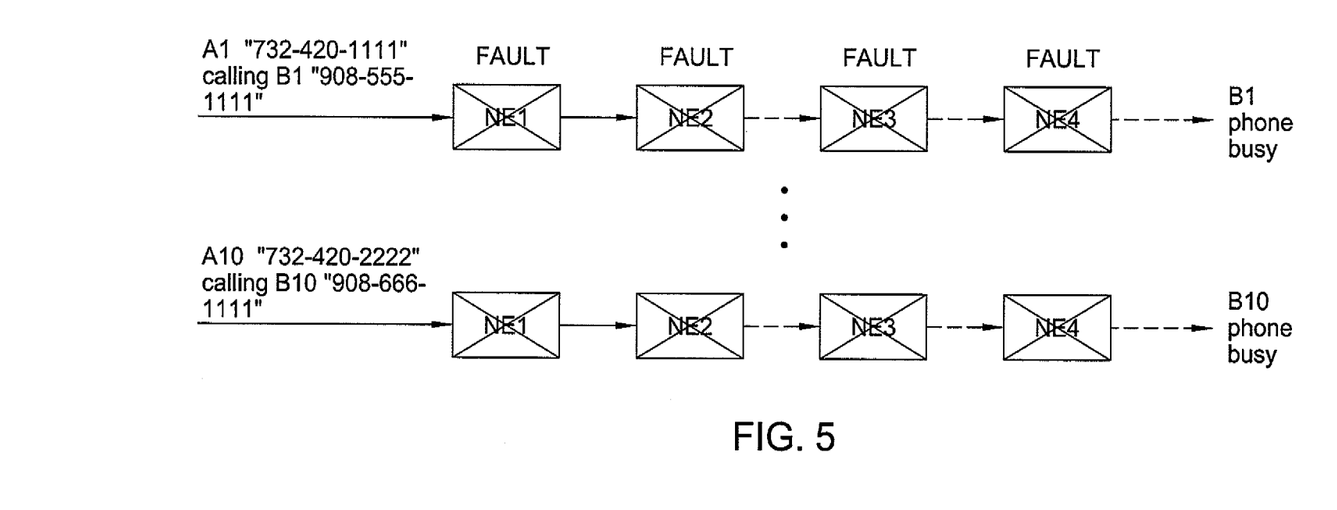
FIG. 5 is a schematic diagram illustrating a third exemplary scenario in which multiple alerts may be generated from CDRs produced by multiple network elements for the multiple calls having the same type of call failure.

FIG. 5 is a schematic diagram illustrating a third exemplary scenario in which multiple alerts may be generated from multiple network elements for the multiple calls having the same type of call failure. In particular, FIG. 5 illustrates ten calls placed from the same NPA (La, NPA 732) to the same NPA (i.e., NPA 908), from callers A1 through A10 to callees B1 through B10, respectively. All ten of these calls fail due to faults at multiple network elements labeled as NE1-NE4. Specifically, all callers receive a signal indicating that the telephone numbers that they are respectively calling are busy.

Without the correlation and suppression technique discussed above, at least four different alerts will be generated for this fault. Assuming that the "busy node" alert threshold for each of the network elements is ten (i.e., ten failed calls), one alert will be generated for each of the network elements NE1, NE2, NE3, and NE4. The network elements each maintains counts for the number of failed calls, and the alerts are generated by the network element performance management system when these counts meet or exceed their respective thresholds.

In one embodiment, the present disclosure employs a correlation and suppression algorithm that results in only a single alert being generated for the call failures illustrated in FIG. 5. As discussed above, assuming that the threshold is ten for each of the networks elements, when callers' A1-A10 calls fail, the network element NE4 will generate an error message that is propagated back through NE3, NE2, and NE1. This error message ensures that the callers A1-A10 will hear an audible "busy" ring-back. The CDRs for each of the network elements NE1-NE4 will contain this error message. In addition, a "busy node" alert will be generated for each of these network elements NE1-NE4 when their respective "busy node" alert thresholds are crossed.

In one embodiment, the present disclosure uses multiple common fields (such as the NPAs of the calling and called numbers) for all "busy node" alerts. Thus, only one "busy node" alert for the network element NE1 needs to be generated; "busy node" alerts for the remaining network elements NE2-NE4 are not generated. Therefore, by suppressing "busy node" alerts for a network element in an NPA in which a "busy node" alert has already been generated for another network element, the number of alerts generated by the network element performance management system for the same type of call failure can be reduced.

Figure 6:
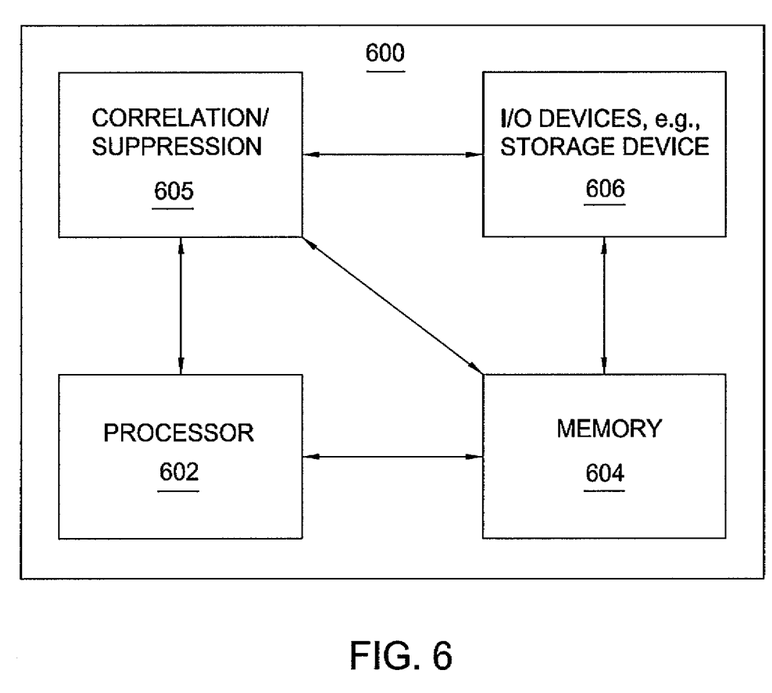
FIG. 6 is a high level block diagram of the alert correlation and suppression method that is implemented using a general purpose computing device.

FIG. 6 is a high level block diagram of the alert correlation and suppression method that is implemented using a general purpose computing device 600. The general purpose computing device 600 may be part of a media gateway, for example. In one embodiment, a general purpose computing device 600 comprises a processor 602, a memory 604, a correlation and suppression module 605 and various input/output (I/O) devices 606 such as a display, a keyboard, a mouse, a modem, a stylus, a joystick, a keypad, controller, a network interface, and the like. In one embodiment, at least one I/O device is a storage device (e.g., a disk drive, an optical disk drive, a floppy disk drive). It should be understood that the correlation and suppression module 605 can be implemented as a physical device or subsystem that is coupled to a processor through a communication channel.

Alternatively, the correlation and suppression module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the correlation and suppression module 605 for correlating and suppressing performance alerts in an IP network described herein with reference to the preceding Figures can be stored on a non-transitory computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling a plurality of alerts in a packet network, the method comprising:
    receiving, by the processor, the plurality of alerts relating to a fault in the packet network, wherein the plurality of alerts is generated from information contained in a plurality of call detail records;
    correlating, by the processor, the plurality of alerts into a set of performance alerts, the set of performance alerts being associated with the fault; and
    suppressing, by the processor, a further alert relating to the fault in the packet network when the fault comprises a problem with a numbering plan area in the packet network, wherein the further alert comprises a cutoff 911 node alert for a network element in the packet network that serves the numbering plan area, when an originating caller 911 cutoff alert has already been generated for the numbering plan area, the originating caller 911 cutoff alert being one of the performance alerts.

2. A method for handling a plurality of alerts in a packet network, the method comprising:
    receiving, by the processor, the plurality of alerts relating to a fault in the packet network, wherein the plurality of alerts is generated from information contained in a plurality of call detail records;
    correlating, by the processor, the plurality of alerts into a set of performance alerts, the set of performance alerts being associated with the fault; and
    suppressing, by the processor, a further alert relating to the fault in the packet network when the fault is a problem with a network element in the packet network, wherein the further alert relates to a numbering plan area in the packet network, wherein the further alert comprises a blockage numbering plan area alert for a numbering plan area in which a blockage node alert has already been generated, the blockage node alert being one of the performance alerts.

3. The method of claim 1, wherein the suppressing further comprises:
    suppressing all but a single network element-based alert when the fault relates to a plurality of calls sharing a common call flow.

4. The method of claim 3, wherein the all but a single network element-based alert is a busy node alert.

5. The method of claim 1, wherein the packet network is an internet protocol network.

6. The method of claim 1, further comprising:
    outputting the set of performance alerts to a network administrator.

7. The method of claim 1, wherein the plurality of call detail records is obtained from a plurality of network elements in the packet network based on the numbering plan area.

8. A non-transitory computer readable medium storing an executable program for handling a plurality of alerts in a packet network which, when executed by a processor, causes the processor to perform operations, the operations comprising:
    receiving the plurality of alerts relating to a fault in the packet network, wherein the plurality of alerts is generated from information contained in a plurality of call detail records;
    correlating the plurality of alerts into a set of performance alerts, the set of performance alerts being associated with the fault; and
    suppressing a further alert relating to the fault in the packet network when the fault comprises a problem with a numbering plan area in the packet network, wherein the further alert comprises a cutoff 911 node alert for a network element in the packet network that serves the numbering plan area, when an originating caller 911 cutoff alert has already been generated for the numbering plan area, the originating caller 911 cutoff alert being one of the performance alerts.

9. The non-transitory computer readable medium of claim 8, wherein the suppressing further comprises:
    suppressing all but a single network element-based alert when the fault relates to a plurality of calls sharing a common call flow.

10. The non-transitory computer readable medium of claim 9, wherein the all but a single network element-based alert is a busy node alert.

11. The non-transitory computer readable medium of claim 8, further comprising:
    outputting the set of performance alerts to a network administrator.

12. The non-transitory computer readable medium of claim 8, wherein the plurality of call detail records is obtained from a plurality of network elements in the packet network based on the numbering plan area.

13. The method of claim 2, wherein the suppressing further comprises:
    suppressing all but a single network element-based alert when the fault relates to a plurality of calls sharing a common call flow.

14. The method of claim 13, wherein the all but a single network element-based alert is a busy node alert.

15. The method of claim 2, wherein the plurality of call detail records is obtained from a plurality of network elements in the packet network based on the numbering plan area.

* * * * *